US009273556B2

(12) United States Patent
Gaither

(10) Patent No.: US 9,273,556 B2
(45) Date of Patent: *Mar. 1, 2016

(54) ROTARY ENGINE WITH ROTARY POWER HEADS

(71) Applicant: John Larry Gaither, Camden, NC (US)

(72) Inventor: John Larry Gaither, Camden, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,317

(22) Filed: Jan. 26, 2015

(65) Prior Publication Data

US 2015/0128895 A1  May 14, 2015

Related U.S. Application Data

(63) Continuation-in-part of application No. 13/417,197, filed on Mar. 9, 2012, now Pat. No. 8,967,114.

(60) Provisional application No. 61/450,654, filed on Mar. 9, 2011.

(51) Int. Cl.
*F02B 53/00* (2006.01)
*F02B 53/04* (2006.01)
(Continued)

(52) U.S. Cl.
CPC . *F01C 21/08* (2013.01); *F01C 1/28* (2013.01); *F01C 17/02* (2013.01); *F02B 53/04* (2013.01); *F02B 53/12* (2013.01); *F04C 2240/603* (2013.01)

(58) Field of Classification Search
CPC ............ F01C 1/28; F01C 21/08; F01C 21/18; F02B 53/00; F02C 3/16; F02C 3/165
USPC ......... 123/213, 232, 228, 231, 236, 241, 246, 123/249; 60/39.34–39.35; 418/91, 191
See application file for complete search history.

(56) References Cited

U.S. PATENT DOCUMENTS 1,291,273 A * 1/1919 Tyler .......................... 60/39.34
2,297,529 A * 9/1942 Berry ...................... F02B 53/00
418/191

(Continued)

FOREIGN PATENT DOCUMENTS

DE       4119622 A1 * 12/1992 ............. F02B 53/00
DE  102007054196 A1 *  5/2009 ................ F01C 1/22

(Continued)

OTHER PUBLICATIONS

U.S. Appl. No. 13/417,197, *Ex Parte Quayle* Action, mailed on Aug. 14, 2014, 26 pages.*
U.S. Appl. No. 13/417,197, Non-Final Action, mailed on Mar. 20, 2014, 20 pages.*
U.S. Appl. No. 13/417,197, Notice of Allowance, mailed on Oct. 27, 2014, 7 pages.*

(Continued)

*Primary Examiner* — Thai Ba Trieu
(74) *Attorney, Agent, or Firm* — Kilpatrick Townsend & Stockton, LLP

(57) ABSTRACT

A rotary engine includes a casing having a first circular boring and a second circular boring smaller than the first circular boring. The first circular boring interconnects with the second circular boring. A piston rotor can move in a rotating manner within the first circular boring in the casing. A power head, ported to pass exhaust gases through a hollow center shaft, can move in a rotating manner within the second circular boring in the casing. The piston rotor and the power head can be coupled via a gear system to properly rotate during operation, with the piston rotor rotating counterclockwise and the power head rotating clockwise, or vice versa.

12 Claims, 10 Drawing Sheets

(51) Int. Cl.
*F01C 1/08* (2006.01)
*F01C 1/24* (2006.01)
*F01C 21/08* (2006.01)
*F01C 1/28* (2006.01)
*F02B 53/12* (2006.01)
*F01C 17/02* (2006.01)

(56) References Cited

U.S. PATENT DOCUMENTS

| | | | |
|---|---|---|---|
| 2,760,466 A * | 8/1956 | Black, Jr. | 123/203 |
| 3,026,088 A * | 3/1962 | Green | 415/91 |
| 3,059,428 A * | 10/1962 | Galonska | F02C 3/16 60/39.15 |
| 3,295,505 A * | 1/1967 | Jordan | 123/241 |
| 3,329,132 A * | 7/1967 | De Coye De Castelet | 123/213 |
| 3,358,439 A * | 12/1967 | De Coye De Castelet | 123/213 |
| 3,913,534 A * | 10/1975 | Bratten | 123/213 |
| 4,454,844 A * | 6/1984 | Kinsey | 123/236 |
| 4,481,920 A * | 11/1984 | Carr et al. | 123/246 |
| 4,741,154 A * | 5/1988 | Eidelman | 60/39.34 |
| 6,062,188 A * | 5/2000 | Okamura | 123/228 |
| 6,539,913 B1 * | 4/2003 | Gardiner | 123/231 |
| 6,978,758 B2 * | 12/2005 | Elmer | 123/236 |
| 7,591,129 B2 * | 9/2009 | Worrell | 60/39.35 |
| 7,621,253 B2 * | 11/2009 | Mirabile | 123/213 |
| 7,637,243 B2 * | 12/2009 | Qamhiyeh | 123/241 |
| 8,061,327 B2 * | 11/2011 | Zink et al. | 123/244 |
| 8,448,417 B1 * | 5/2013 | Farber | 60/39.34 |
| 8,695,565 B2 * | 4/2014 | Wright | 123/241 |
| 8,839,599 B1 * | 9/2014 | Mesa, Jr. | 60/39.34 |
| 8,967,114 B2 * | 3/2015 | Gaither | 123/232 |

FOREIGN PATENT DOCUMENTS

| | | | | |
|---|---|---|---|---|
| FR | 2574494 A1 * | 6/1986 | | F04C 18/20 |
| GB | 1573552 A * | 8/1980 | | F01C 1/3446 |
| GB | 2169964 A * | 7/1986 | | F01C 1/46 |
| JP | 03286170 A * | 12/1991 | | F01C 1/22 |
| WO | WO 2011086183 A2 * | 7/2011 | | F01C 1/36 |

* cited by examiner

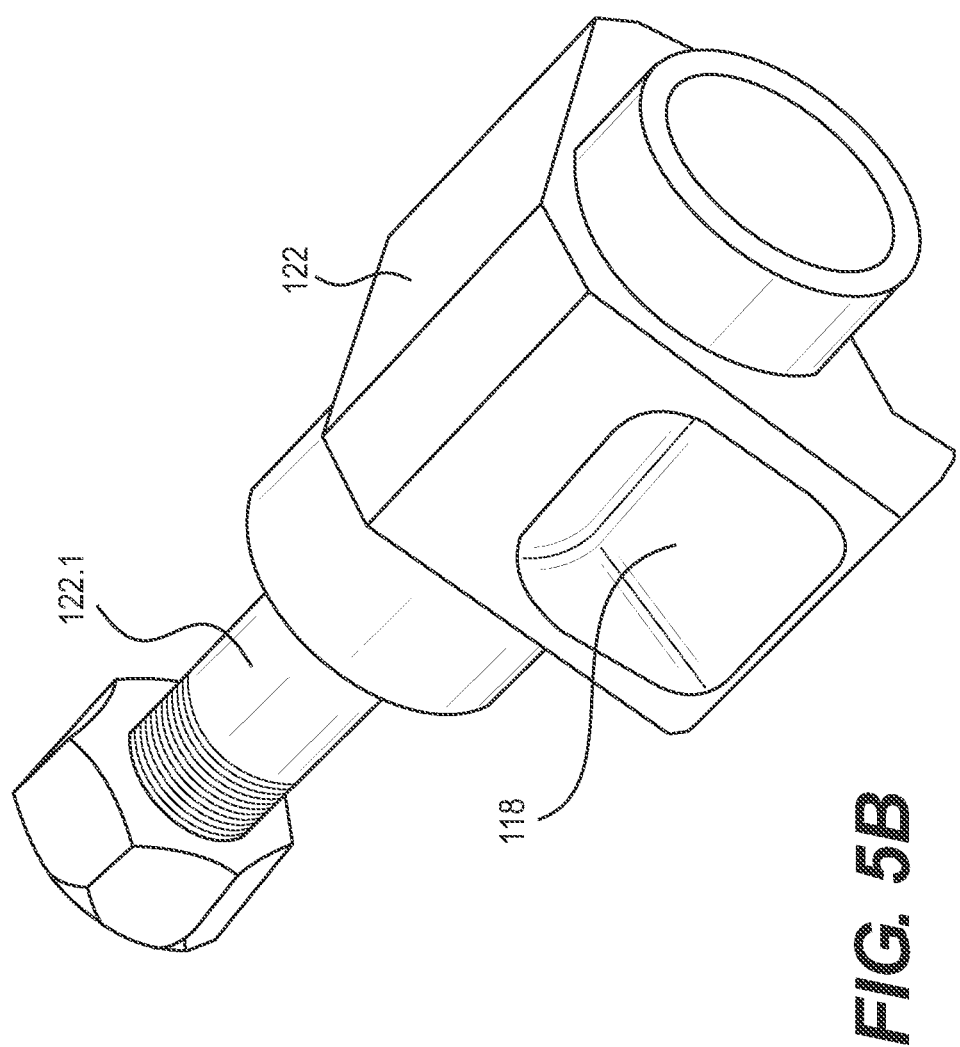

ROTARY ENGINE WITH ROTARY POWER HEADS

CROSS-REFERENCE TO RELATED APPLICATIONS

This disclosure is a continuation-in-part of U.S. patent application Ser. No. 13/417,197 filed Mar. 9, 2012 and titled "ROTARY ENGINE WITH ROTARY POWER HEADS," which claims priority to Provisional Patent Application No. 61/450,654, filed on Mar. 9, 2011, in the United States Patent & Trademark Office, the disclosure of which is incorporated herein by reference.

TECHNICAL FIELD

The present disclosure relates to a rotating internal combustion engine, and more particularly, a rotary engine.

BACKGROUND

Numerous innovations for rotary displacement engines have been provided in the prior art. These engines are constructed from stronger, more expensive materials. These engines contain many more moving parts, which have to be machined with much greater difficulty and associated tooling expense. The weight and bulk of the other engines can make them unacceptable or undesirable for some applications. A more efficient alternative is desirable.

SUMMARY

In some embodiments, the disclosed rotary engine can be a high torque rotary engine that is simple and inexpensive to manufacture. In additional or alternative embodiments, the disclosed rotary engine can be simple to use and maintain. In additional or alternative embodiments, the disclosed rotary engine can include a casing having a large circular boring and a small circular boring whereby the small circular boring interconnects with the large circular boring. A piston rotor rotates within the large circular boring in the casing. A power head rotates within the small circular boring in the casing. Proper rotational relationship between the piston rotor and the power head is maintained by a simple gear train external to this casing. The piston rotor rotates counterclockwise and the power head rotates clockwise, or vice versa.

One or more novel features of the rotary engine are set forth in the appended claims. The rotary engine itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 5B is a perspective view similar of a power head, showing how the exhaust gases can flow out through the hollow shaft in the power head.

Figure 1:
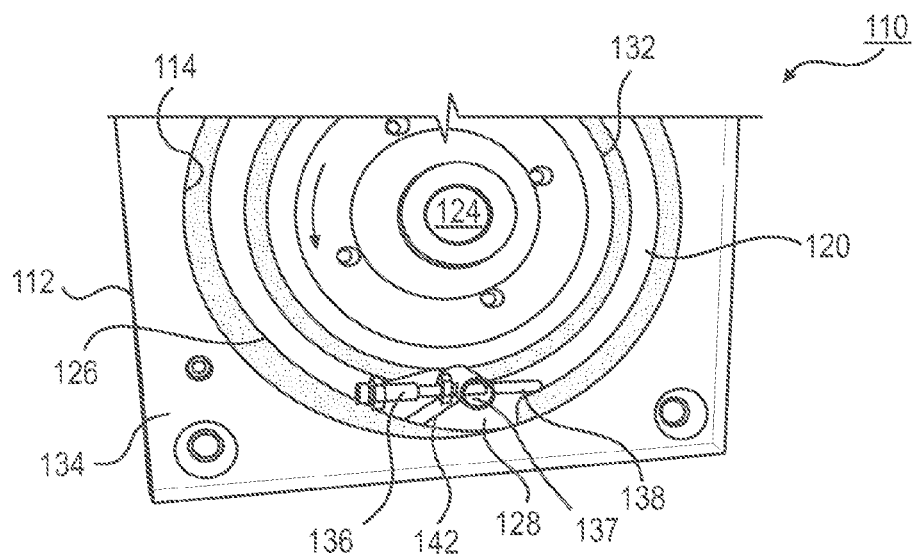
FIG. 1 is a front view with the upper portion broken away.
Figure 2:
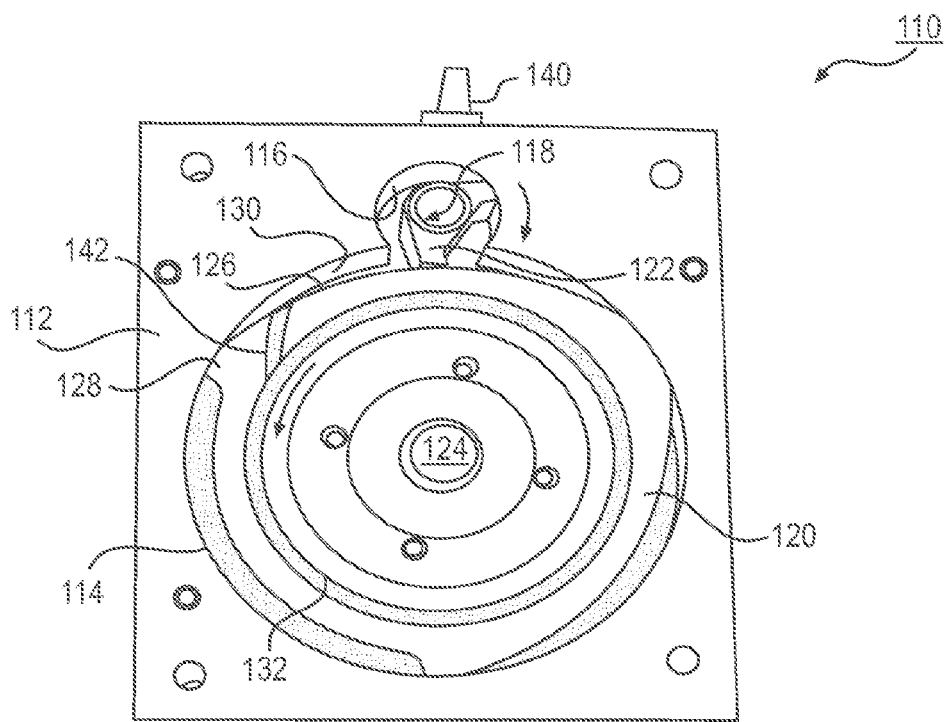
FIG. 2 is a front view with the front plate removed therefrom, showing how the fuel air mixture can be compressed in the intake/compression chamber.
Figure 3:
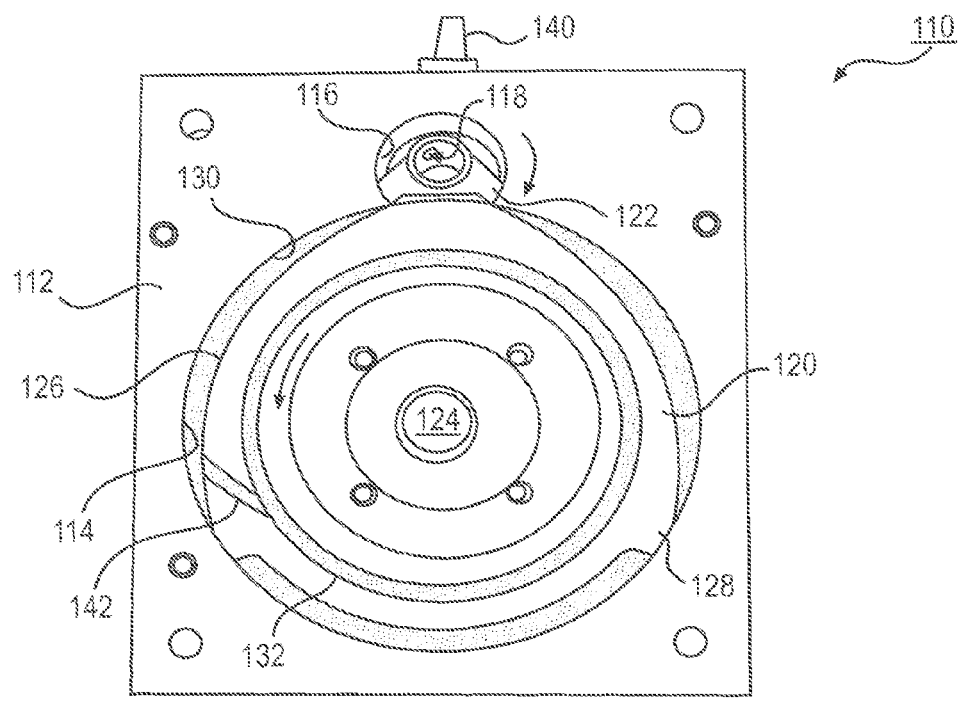
FIG. 3 is a front view similar to FIG. 2, showing how the fuel air mixture can be compressed to its maximum density in the intake/compression chamber.
Figure 4:
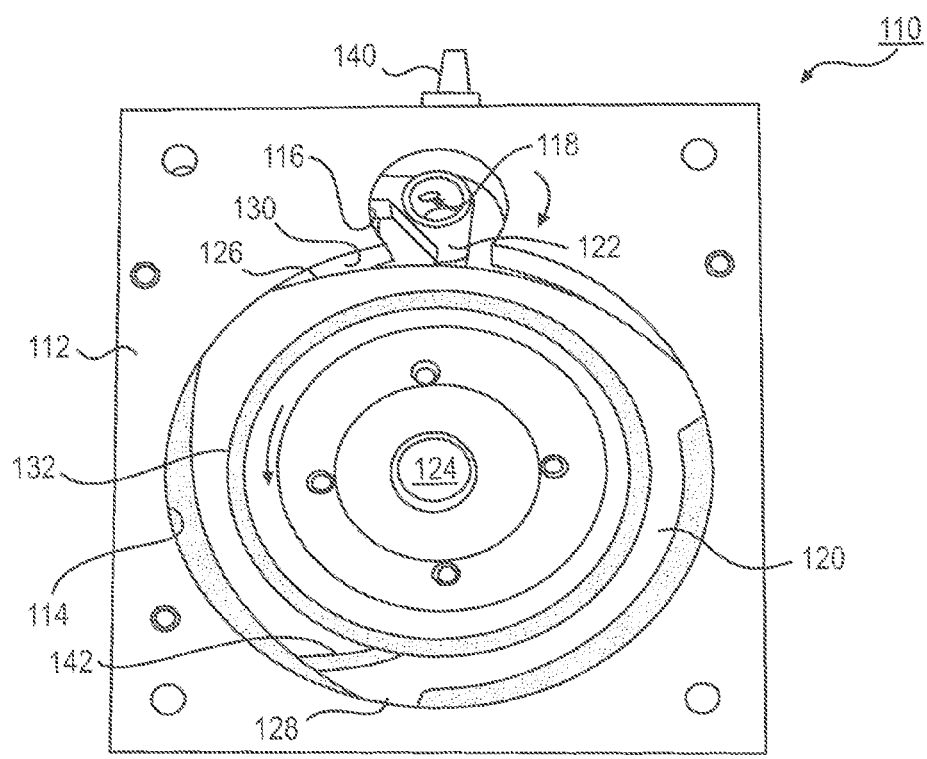
FIG. 4 is a front view similar to FIG. 3, showing how the piston rotor can be rotated counterclockwise (or vice versa) by the rapidly expanding gases.
Figure 5A:
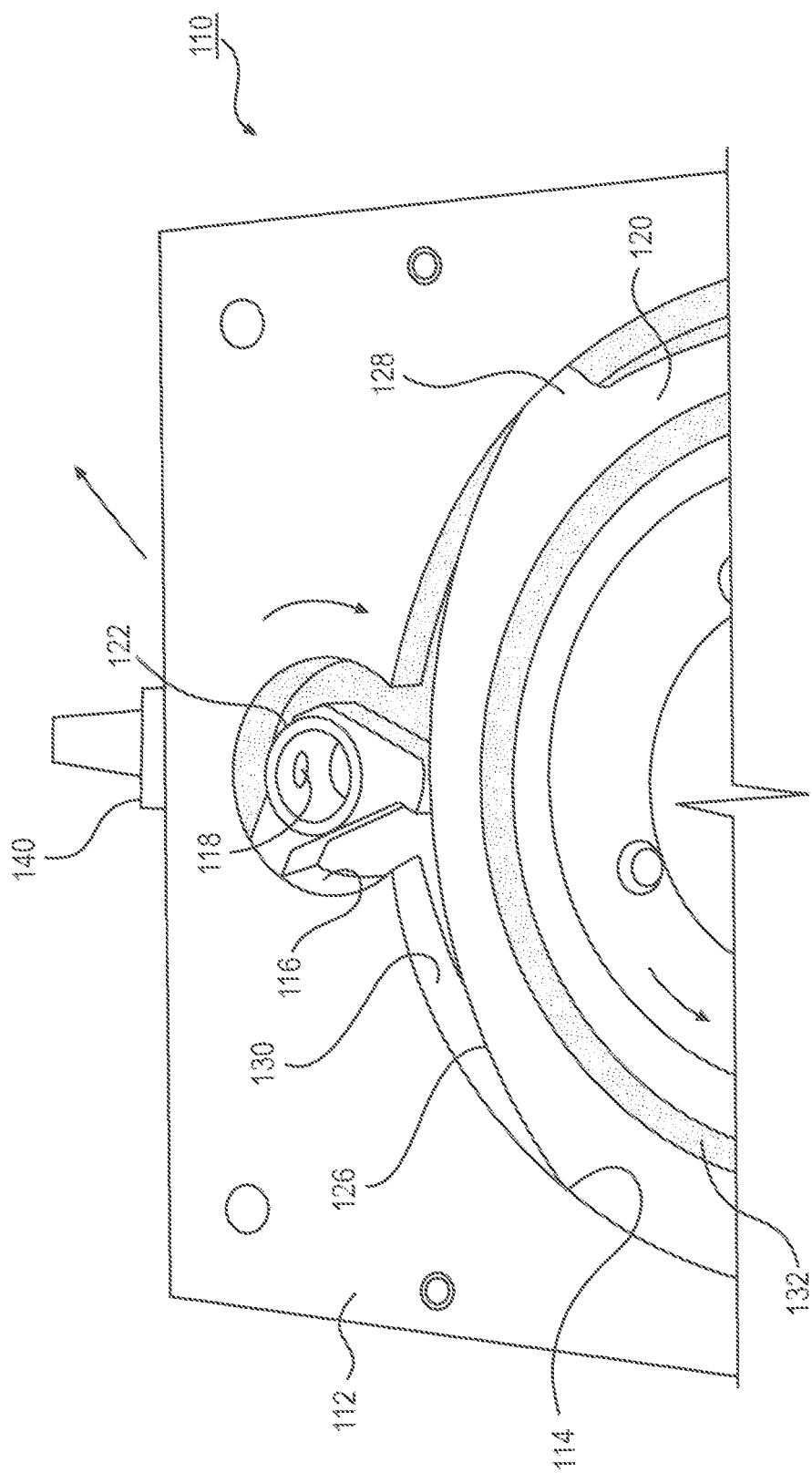
FIG. 5A is a front view similar to FIG. 4 with the lower portion broken away, showing how the exhaust gases can flow out through the hollow shaft in the power head.

REFERENCE NUMERALS UTILIZED IN THE DRAWING 110 rotary engine
112 casing in rotary engine 110
114 large circular boring in casing 112
116 small circular boring in casing 112
118 exhaust port in power head 122
120 piston rotor in large circular boring 114
122 power head in small circular boring ported for exhaust flow
122.1 powerhead shaft
124 shaft in piston rotor 120
126 depression on circumference for intake and compression 128
128 circumference of piston rotor 120
130 intake/compression chamber between depression 126 and large circular boring 114
132 intake collector ring on piston rotor 120
134 front plate on casing 112
136 carburetor on front plate 134
137 fresh air intake on carburetor 136
138 fuel intake stem on carburetor 136
140 solid state ignition system on casing 112
140.1 plug/coil module
140.2 ignition reference sensor
140.3 battery/alternator
140.4 ignition switch
140.5 CU module
142 Involute pumping gases from collector ring to intake/compression chamber 130
144 gear train
146 bevel gear mounted on main rotor shaft
148 bevel gear mounted on power head shaft
150 shaft with bevel gears on each end

DETAILED DESCRIPTION

A rotary engine with rotary power heads is disclosed that can convert the heat energy stored in a fuel into mechanical energy through a process of combustion. The rotary engine provides an inexpensive, high torque, prime mover for everything from weed eaters to high performance aircraft. The process is one of pure rotation, it has no reciprocating parts, and is of a simple construction. This engine can be used to great advantage in any application that can be or is powered by conventional reciprocating engines and many turbines. The rotary engine inherently supercharges and has perfect scavenging of exhaust gases. The rotary engine combines the high-speed capabilities of turbines with the positive displacement character of reciprocating engines.

As shown in FIGS. 1, 2, 3, 4 and 5A, a rotary engine 110 comprises a casing 112 having a large circular boring 114, a small circular boring 116, whereby the small circular boring 116 interconnects with the large circular boring 114. A piston rotor 120 is carried in a rotating manner within the large circular boring 114 in the casing 112. A power head 122 is carried in a rotating manner within the small circular boring 116 in the casing 112. The piston rotor and the powerhead maintain a precise rotational relationship 1:1 ratio with each other thru a gear train mounted externally to this chamber (not shown). The piston rotor rotates counter clockwise while the powerhead rotates clockwise, or vice versa.

A shaft 124 extends centrally from the piston rotor 120 for power output therefrom. The piston rotor 120 has a depression 126 formed on its circumference 128 to produce an intake/compression chamber 130 between the depression 126 and the large circular boring 114 in the casing 112. An involute 142 integrated on the piston rotor 120 can move collector ring gases into the intake/compression chamber 130.

As shown in FIG. 1, a front plate 134 is mounted on the casing 112. A carburetor 136 having a fresh air intake 137 and a fuel intake 138 is affixed to the front plate 134 to supply a fuel air mixture into the collector ring 132. A solid state ignition system 140 on the casing 112 ignites the compressed fuel air mixture at the appropriate time in the cycle, at or near top dead center. Exhaust gases travel through the power head 122 and exit out of the exhaust port 118 in the power head 122. The casing 112 is fabricated of a suitable durable material, such as aluminum, steel or ceramic.

In review, the rotary engine 110 is a high efficiency, high torque, engine that is designed to be used for a wide variety of applications. The present invention comprises a casing 112 that is cast and/or machined of a suitable durable material, such as aluminum, steel, or ceramic. The casing 112 houses in a large circular boring 114 a piston rotor 120 and a power head 122. A shaft 124 runs through the center of the piston rotor 120 for power output and upon which additional power packs may be mounted as dictated by power and design requirements. The power head 122 with the exhaust port 118 affects the desired compression ratio and is installed in a small circular boring 116.

An involute 142 is cast into or otherwise integrated with the piston rotor 120 to help move the fuel air mixture from the collector ring 132 into the intake/compression chamber 130 between a depression 126 on a circumference 128 of the piston rotor 120 and the large boring in the casing. A carburetor 136 having a fresh air intake 137 and a fuel intake 138 is mounted on a front plate 134 to provide a fuel air mixture.

A solid state ignition system 140 mounted on casing 112 ignites the fuel air mixture in the case of fuel requiring a spark. Compression ignition provides the igniting source for fuels of that type. The rotary engine can have the size of 8 inches (W), 10 inches (L) and 12 inches (H). The engine can rotate from 300 revolutions per minutes (rpm) to 20,000 rpm. The volume's intake/compression chamber can be 50 cc-5000 cc. The measurements and other specifications will vary widely depending on power and speed demands on the particular application.

FIG. 5B depicts the power head 122 with the exhaust port 118 and a powerhead shaft 122.1.

Figure 6:
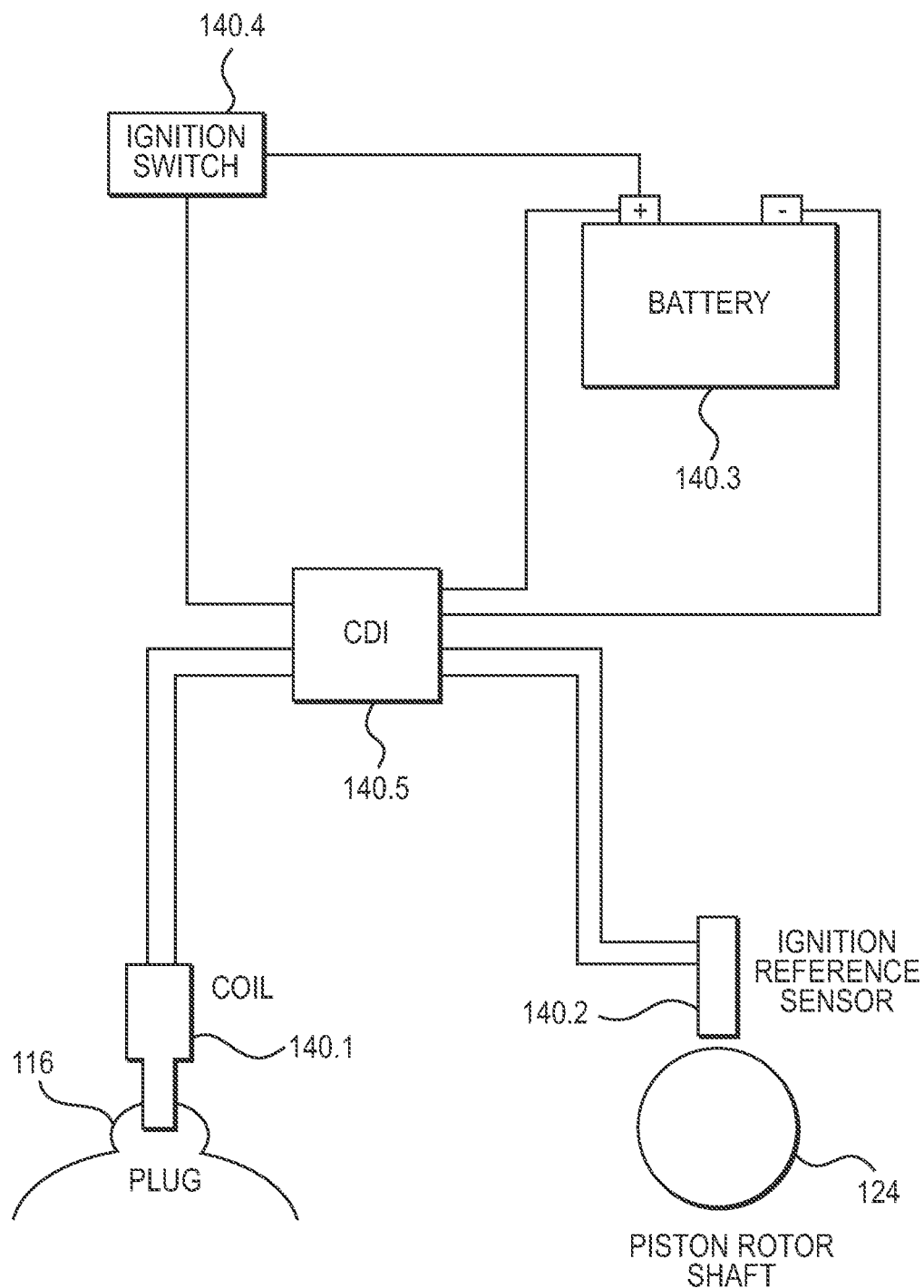
FIG. 6 is a circuit diagram of CU ignition.

As shown in FIG. 6, spark ignition is effected thru the use of a capacitor discharge ignition (CDI) solid state ignition because it is currently considered more satisfactory for high rpm engines. It consists of plug/coil module 140.1 installed in the area directly under the powerhead, a CDI ignition module 140.5 to provide the necessary voltage 140, an ignition reference sensor 140.2 mounted on the piston rotor shaft 124 to provide timing of the spark, a battery/alternator 140.3 to provide initial voltage and an ignition switch 140.4 to turn the system on and off.

Figure 7A:
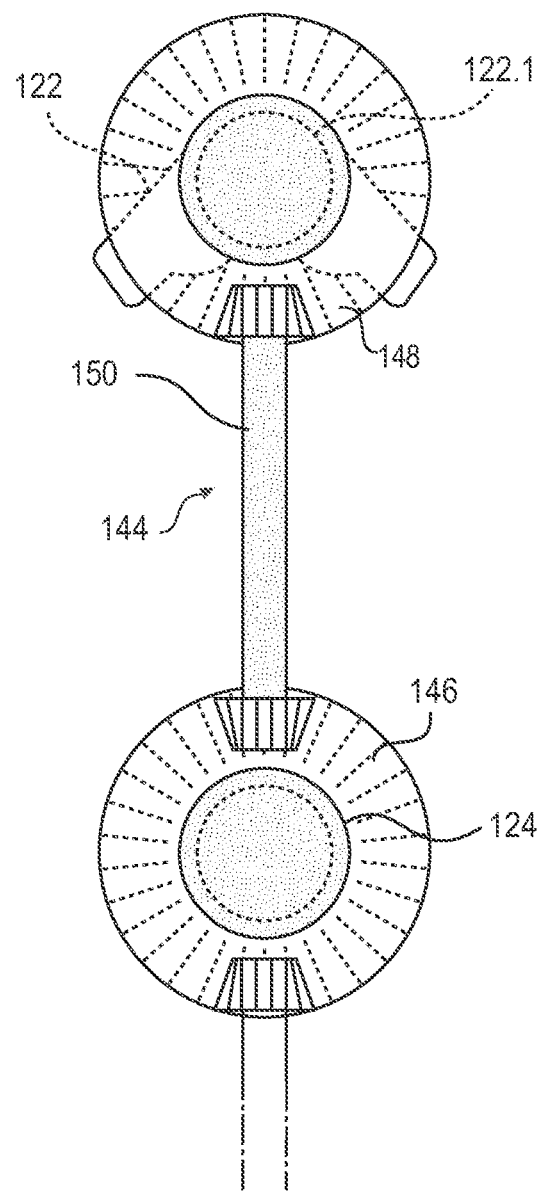
FIG. 7A is a back view of a gear train coupling to the power head and rotor shaft.

As shown in FIG. 7A, the gear train 144 includes a bevel gear 146 mounted and keyed to the main rotor shaft 124, a similar bevel gear 148 mounted and keyed to the power head shaft, and a shaft 150 with bevel gears mounted on each end to mesh with the gears 146, 148 on the main rotor shaft 124 and the power head shaft 122.1, respectively. This gear train 144, properly mounted on the rear case on the rotary engine will cause the piston rotor and the powerhead to maintain the proper angular relationship 1:1 ratio. The piston rotor and the power head maintain a precise rotational relationship 1:1 ratio with each other thru a gear train mounted externally to this chamber (not shown). The piston rotor rotates counter clockwise while the power head rotates clockwise, or vice versa.

Figure 7B:
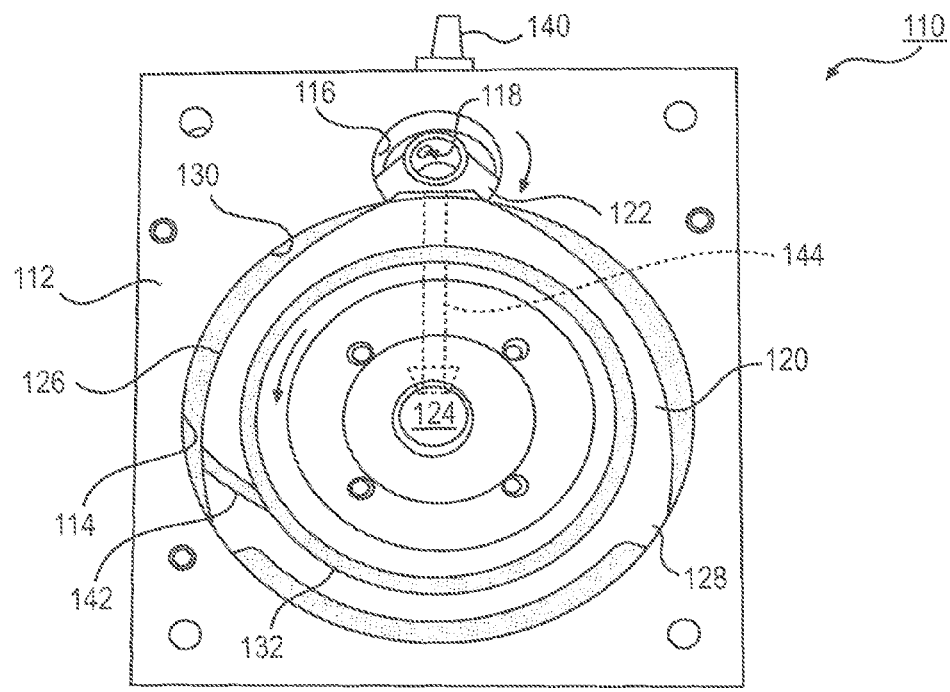
FIG. 7B is a front view similar to FIG. 3 with the phantom gear train on the back.

As shown in FIG. 7B, a gear train 144 (in phantom) mates the piston rotor shaft 124 and the power head 122, so that they are timed to maintain the proper angular relationship 1:1 ratio. The piston rotor 124 and the power head 122 maintain a precise rotational relationship 1:1 ratio with each other thru a gear train mounted externally to this chamber. The piston rotor 124 rotates counter clockwise while the power head rotates clockwise, or vice versa.

Figure 8:
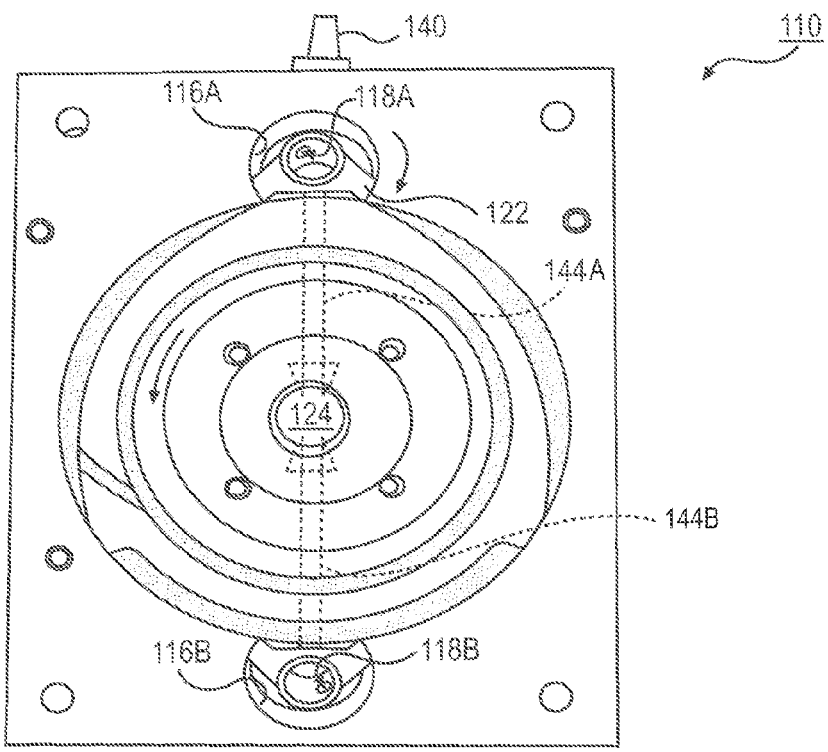
FIG. 8 is a front view similar to FIG. 3, showing how the engine has two symmetric power heads.
Figure 9:
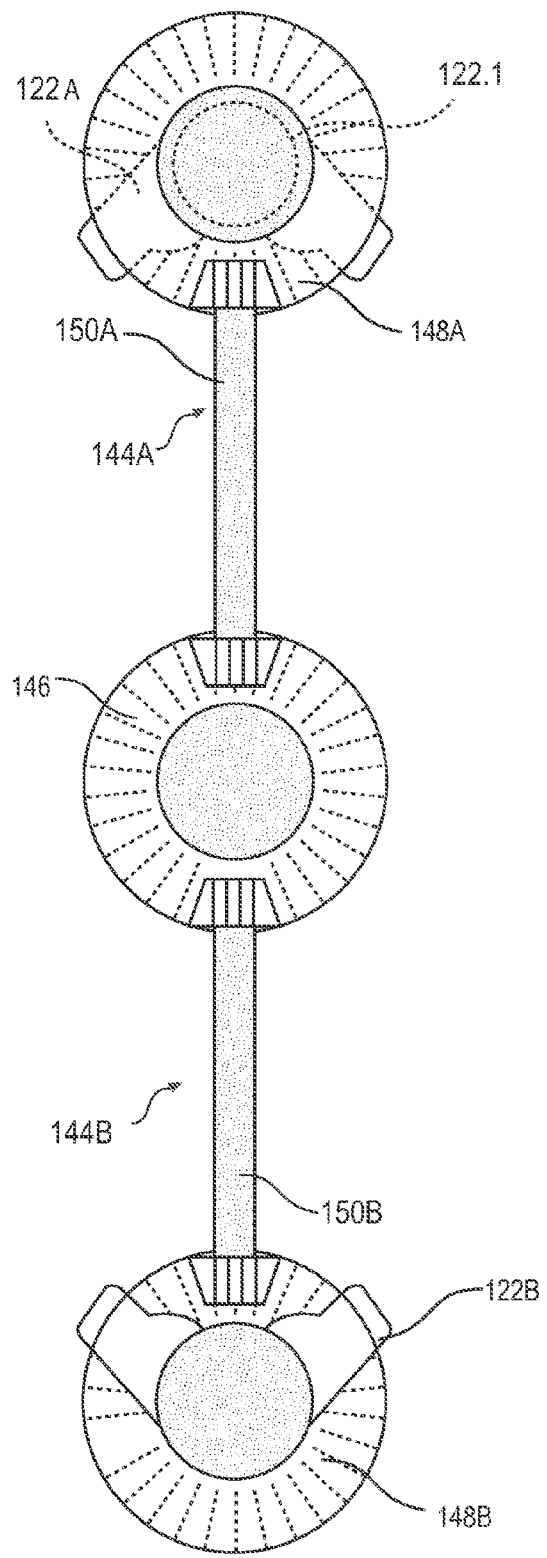
FIG. 9 is a back view of a gear train coupling to the first power head, a rotor shaft, and a second power head.

As shown in FIGS. 8 and 9, the rotary engine herein described can be fabricated with multiple power heads 122 (first head 116A/118A and second head 116B/118B) in the casing with a single piston rotor shaft 124. It can also be fabricated with multiple piston rotor/powerhead combinations on a common main shaft and powerhead shafts with a corresponding set of gear trains 144A, 144B. The gear train 144A includes the bevel gear 146 mounted and keyed to the main rotor shaft 124, a similar bevel gear 148A mounted and keyed to the power head shaft of a power head 122A, and a shaft 150A with bevel gears mounted on each end to mesh with the gears 146, 148A, respectively. The gear train 144B includes the bevel gear 146 mounted and keyed to the main rotor shaft 124, a similar bevel gear 148B mounted and keyed to the power head shaft (not depicted) of a power head 122B, and a shaft 150B with bevel gears mounted on each end to mesh with the gears 146, 148B, respectively. The piston rotor and the first power head maintain a precise rotational relationship 1:1 ratio with each other thru a gear train mounted externally to this chamber (not shown). The piston rotor rotates counter clockwise while the two power heads rotates clockwise, or vice versa.

Figure 10:
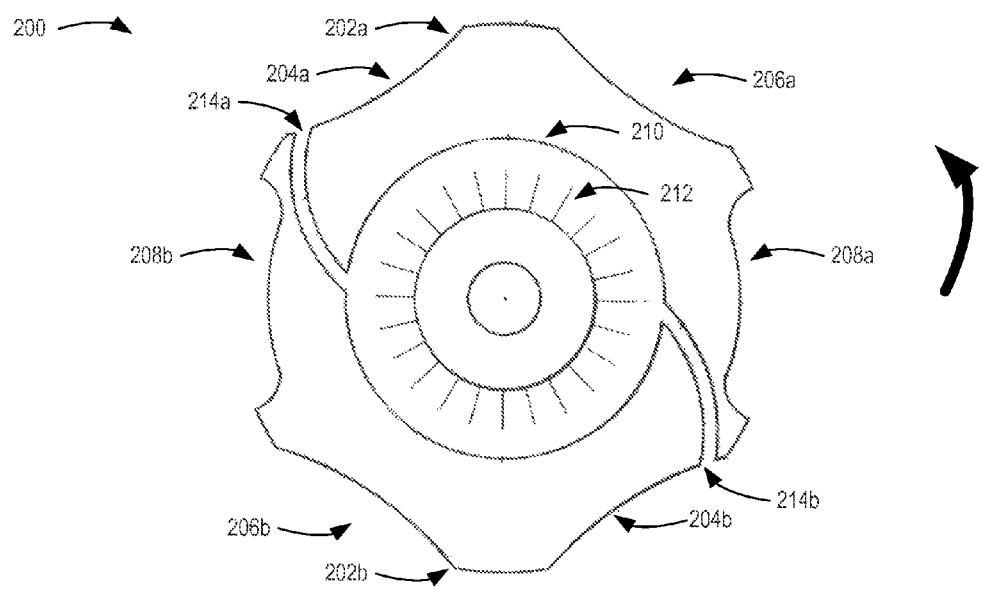
FIG. 10 is a lateral view of a piston rotor having multiple pistons.
Figure 11:
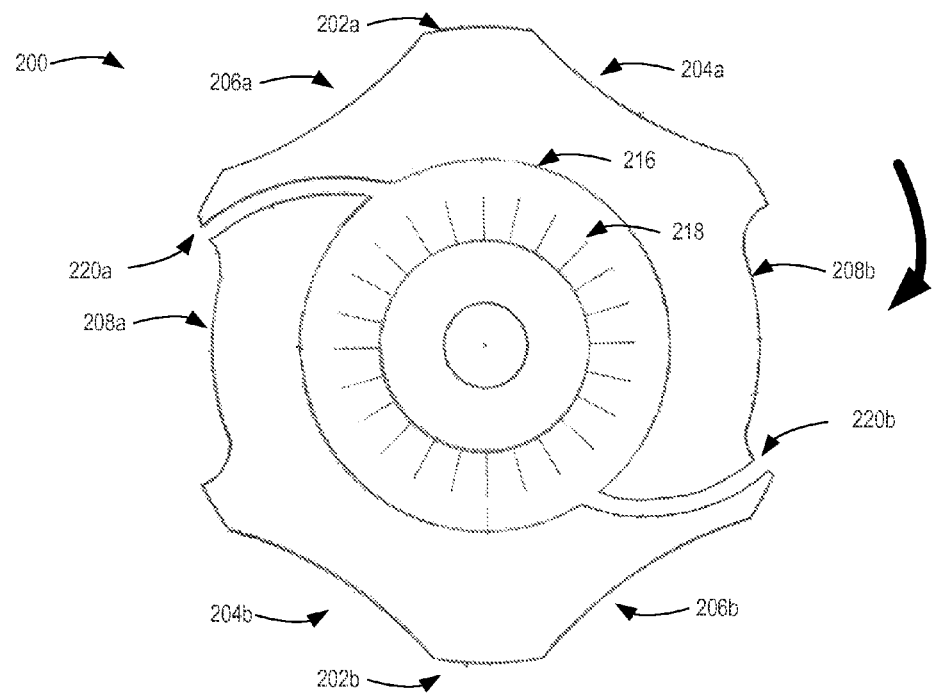
FIG. 11 is another lateral view of the piston rotor depicted in FIG. 10.

In some embodiments, a rotary engine 110 can include a piston rotor having multiple pistons. For example, FIG. 10 is a lateral view of a first face (e.g., a front face) of a rotor 200 having multiple pistons 202a, 202b and FIG. 11 is a lateral view of a second face (e.g., a rear face) of a rotor 200 having multiple pistons 202a, 202b. Embodiments of the rotary engine 110 that include a rotor 200 can replace the piston rotor 120 depicted in previous figures with the rotor 200 depicted in FIGS. 10 and 11. For example, the rotor 200 can be positioned in a boring 114 of the casing 112 depicted in FIGS. 1, 2, 3, 4 and 5A.

The rotor 200 can rotate in a direction depicted by the bold arrows in FIGS. 10 and 11. For example, the rotor 200 can rotate counterclockwise as viewed from the direction depicted in FIG. 10, and the rotor 200 can rotate clockwise as viewed from the direction depicted in FIG. 11, or vice versa. As depicted in FIGS. 10 and 11, a body of the rotor 200 includes depressions defining intake/compression chambers 204a, 204b for intake and compression with respect to the pistons 202a, 202b, respectively. The body of the rotor 200 also includes depressions defining power/exhaust chambers 206a, 206b for power and exhaust with respect to the pistons 202a, 202b, respectively. The body of the rotor 200 also includes depressions defining cooling chambers 208a, 208b for cooling with respect to the pistons 202a, 202b, respectively.

The rotor 200 also includes a collector ring 210. The collector ring 210 can be implemented and/or used in a manner similar to that described above with respect to the intake collector ring on piston rotor 120. An involute 214a defined by a body of the rotor 200 can move gases from the collector ring 210 into the intake/compression chamber 204a. An involute 214b defined by a body of the rotor 200 can move gases from the collector ring 210 into the intake/compression chamber 204b.

A gear train (not shown) similar to the gear train 144 can maintain a rotational relationship between a power head 122 and the rotor 200. The rotational relationship can be proportional to a number of pistons on a rotor. For example, for a rotor 200 having two pistons 202a, 202b, the rotational relationship can be 2:1 such that the power head 122 rotates twice for each rotation of rotor 200. For other rotors similar to rotor 200 and having n pistons, the rotational relationship can be n:1 such that the power head 122 rotates n times for each rotation of rotor 200. The gear train can be implemented in a manner similar to that described above with respect to the gear train 144 depicted in FIG. 7. For example, a modified gear train for the rotor 200 can include a first bevel gear mounted and keyed to the main rotor shaft 124, a second bevel gear mounted and keyed to the power head shaft, and a shaft with additional bevel mounted on each end to mesh with the gears on the main rotor shaft 124 and the power head shaft 122.1. The bevel gears can be selected such that the powerhead 122 and the rotor 200 maintain the proper angular relationship 2:1 ratio or, for rotors having n pistons, the proper n:1 ratio.

In some embodiments, the rotor 200 can also include supercharger vanes 212, as depicted in FIG. 10. In some embodiments, the supercharger vanes 212 can be integrated into the construction of the rotor 200. In other embodiments, the supercharger vanes 212 can be fabricated or otherwise manufactured separately from the rotor 200 and affixed or otherwise coupled to the rotor 200. A rotation of the supercharger vanes 212 can exert a force on one or more gases that are moved from the collector ring 210 into one or more of the intake/compression chambers 204a, 204b. The force exerted on gases that are moved from the collector ring 210 into one or more of the intake/compression chambers 204a, 204b can compress the gases in one or more of the intake/compression chambers 204a, 204b. Compressing the gases in one or more of the intake/compression chambers 204a, 204b can allow a larger amount of these gases to be moved into the intake/compression chambers 204a, 204b. Using a larger amount of these gases in the intake/compression chambers 204a, 204b can increase an amount of power outputted by the rotary engine 110 using a rotor 200. In some embodiments, the supercharger vanes 212 can be omitted.

In some embodiments, the rotor 200 can also include an additional collector ring 216 and supercharger vanes 218, as depicted in FIG. 11. These supercharger vanes 218 can be used for cooling the rotor 200. In some embodiments, the supercharger vanes 218 can be integrated into the construction of the rotor 200. In other embodiments, the supercharger vanes 218 can be fabricated or otherwise manufactured separately from the rotor 200 and affixed or otherwise coupled to the rotor 200. A rotation of the supercharger vanes 218 can exert a force on one or more gases that are moved from the collector ring 216 into one or more of the cooling chambers 208a, 208b via involutes 220a, 220b, respectively, that are defined by a body of the rotor 200. The force exerted on gases that are moved from the collector ring 216 into one or more of the cooling chambers 208a, 208b can increase the amount of air available in one or more of the cooling chambers 208a, 208b for cooling the rotor 200. Using a larger amount of air in the cooling chambers 208a, 208b can maintain the rotor 200 at a safe operational temperature. In some embodiments, the supercharger vanes 218 can be omitted.

The operation of a rotary engine 110 having a rotor 200 and one or more power heads can be similar to the operation of a rotary engine 110 having a rotor 120 and one or more power heads with modifications suitable for the use of multiple piston on the piston rotor as described above.

Figure 12:
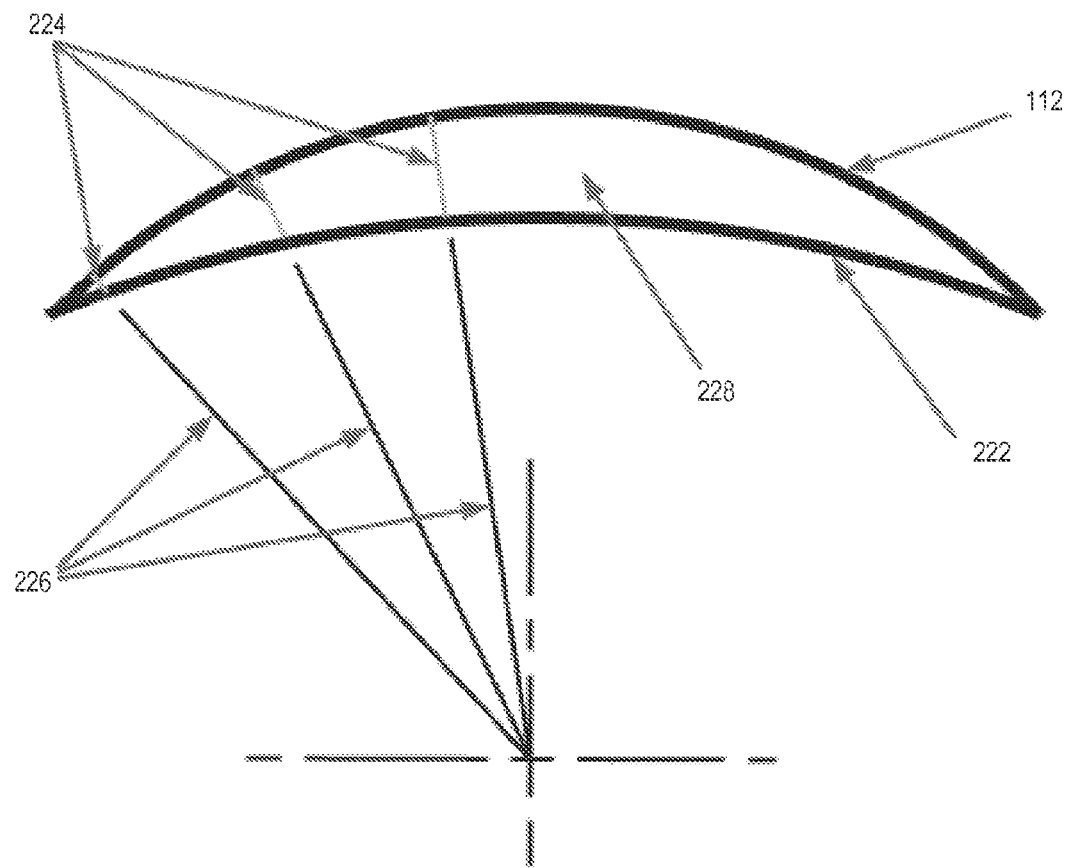
FIG. 12 is a diagram depicting a lever arm and an effective cylinder head provided by the piston rotor of the rotary engine.

The rotary engine 110 can operate with a lever arm that is substantially constant. Operating with a lever arm that is substantially constant can provide higher torque than is possible in other rotary engines or in reciprocating engines. FIG. 12 is a diagram depicting the rotary engine operating with a lever arm that is substantially constant. FIG. 12 depicts the casing 112 and a portion 222 of a piston rotor (e.g., the rotor 120 or the rotor 200), including a power/exhaust chamber 228 of the piston rotor 222 (e.g., one of the power/exhaust chambers 206a, 206b). An effective cylinder head 224 (e.g., an area perpendicular to the radius of the piston rotor 222) can increase as the piston rotor 222 rotates through a power/exhaust cycle and a combustion pressure decreases. The lever arm 226 can be substantially constant such that a high, substantially uniform torque is provided through the entire power stroke.

It will be understood that each of the elements described above, or two or more together, may also find a useful application in other types of constructions differing from the types described above.

While the invention has been illustrated and described as embodiments of a rotary engine, accordingly it is not limited to the details shown, since it will be understood that various omissions, modifications, substitutions, combinations, and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention. directional Descriptions such as "upper," "lower," "back," "front," "top," "bottom," "clockwise," "counter-clockwise," etc. in relation to the illustrative aspects as they are depicted in the figures. Like the illustrative aspects, the numerals and directional descriptions included in herein should not be used to limit the present disclosure.

The invention claimed is:

1. A rotary engine comprising:
   a casing having a first circular boring of a first size and a second circular boring of a second size that is smaller than the first size, wherein the first circular boring is interconnected with the second circular boring;
   a piston rotor having one or more pistons positioned in the first circular boring and movable in a rotating manner within the first circular boring in the casing, the piston rotor having at least three depressions formed in a circumference of the piston rotor, the at least three depressions defining, within the first circular boring:
      one or more intake/compression chambers,
      one or more power/exhaust chambers, wherein each of the one or more power/exhaust chambers is adjacent to a respective intake/compression chamber, and
      one or more cooling chambers, wherein each of the one or more cooling chambers is between a respective intake/compression chamber and a respective power/exhaust chamber;
   a power head positioned within the second circular boring and configured to rotate within the second circular boring, the power head including an exhaust port to vent exhaust gases into a ported hollow center shaft within the power head;
   a rotor shaft extending centrally from the piston rotor;
   a carburetor having a fuel intake port and an air intake port in gaseous communication with the collector ring to supply the fuel/air mixture into the collector ring; and
   a capacitor discharge solid state ignition system on the casing, the capacitor discharge solid state ignition system having a spark plug module that is located under the power head, wherein the spark plug module is configured to ignite a fuel/air mixture in the one or more intake/compression chambers at or near top dead center.

2. The rotary engine of claim 1, wherein the rotor shaft is configured for providing power output in combination with additional power output provided from a power head shaft extending from the power head.

3. The rotary engine of claim 2, further comprising:
   a gear train comprising: a first bevel gear coupled to the rotor shaft;
   a second bevel gear coupled to the power head shaft; and
   a linking shaft having first and second gears that are mounted on opposite ends of the linking shaft and that are positioned to respectively engage the first bevel gear on the rotor shaft and the second bevel gear the power head shaft.

4. The rotary engine of claim 3, wherein the piston rotor and the power head are configured to counter rotate at rotational speeds corresponding to a number of the one or more pistons, wherein the gear train is configured with a gear ratio such that a number of rotations of the power head occurs for each rotation of the piston rotor, wherein the number of rotations of the power head corresponds to the number of the one or more pistons.

5. The rotary engine of claim 3, wherein the piston rotor comprises a plurality of pistons.

6. The rotary engine of claim 1, further comprising one or more involutes defined in the piston rotor and the collector ring in gaseous communication with the one or more involutes, the one or more involutes and the collector ring configured for drawing and compressing the fuel/air mixture from the carburetor into the one or more intake/compression chambers.

7. The rotary engine of claim 6, further comprising a plurality of supercharger vanes coupled to or integral with the piston rotor, wherein the plurality of supercharger vanes are configured for applying a force to the fuel/air mixture from the carburetor in a direction of the one or more intake/compression chambers.

8. The rotary engine of claim 1, further comprising one or more involutes defined in the piston rotor and a collector ring in gaseous communication with the one or more involutes, the one or more involutes and the collector ring configured for drawing and compressing the fuel/air mixture from the carburetor into the one or more cooling chambers.

9. The rotary engine of claim 8, further comprising a plurality of supercharger vanes coupled to or integral with the piston rotor, wherein the plurality of supercharger vanes are configured for applying a force to the fuel/air mixture from the carburetor in a direction of the one or more cooling chambers.

10. The rotary engine of claim 1, wherein the piston rotor is adapted to provide a lever arm that remains substantially constant through a power stroke of the rotary engine.

11. The rotary engine of claim 1, wherein the casing is formed from at least one of aluminum, steel, or ceramic.

12. The rotary engine of claim 1, wherein the rotary engine is configured to cause the fuel/air mixture to move into the intake/compression chamber from the carburetor by a combination of centrifugal force and suction.

* * * * *